United States Patent [19]
Lippold et al.

[11] Patent Number: 5,797,328
[45] Date of Patent: Aug. 25, 1998

[54] DEVICE AND METHOD FOR PURIFICATION AND RECIRCULATION OF CLEANING AGENT IN A PRINTING MACHINE

[75] Inventors: Andreas Lippold, Nidderau; Edgar Dorsam, Obertshausen, both of Germany

[73] Assignee: MAN Roland Druckmaschinen AG, Germany

[21] Appl. No.: 832,727

[22] Filed: Apr. 11, 1997

[30] Foreign Application Priority Data

Apr. 12, 1996 [DE] Germany .................... 196 14 395.0

[51] Int. Cl.$^6$ ........................................... B01D 21/00
[52] U.S. Cl. .................... 101/483; 134/109; 210/803; 210/805; 210/806; 210/96.1; 210/322; 101/423
[58] Field of Search ........................ 210/803, 805, 210/806, 322, 257.1, 96.1, 804; 134/109; 101/423, 424, 425, 483

[56] References Cited

U.S. PATENT DOCUMENTS

| 4,317,720 | 3/1982 | Hawk | 210/86 |
| 5,069,755 | 12/1991 | Durr et al. | 202/169 |
| 5,090,498 | 2/1992 | Hamill | 175/206 |
| 5,298,167 | 3/1994 | Arnold | 210/703 |
| 5,323,705 | 6/1994 | Durrnagel | 101/424 |
| 5,422,019 | 6/1995 | Carmen | 210/787 |
| 5,487,907 | 1/1996 | Drown et al. | 426/417 |
| 5,492,619 | 2/1996 | Batten | 210/86 |

FOREIGN PATENT DOCUMENTS

| 0 531 773 | 8/1992 | European Pat. Off. . |
| 42 11 656 | 10/1993 | Germany . |

*Primary Examiner*—Ren Yan
*Assistant Examiner*—Dave A. Ghatz
*Attorney, Agent, or Firm*—Leydig, Voit & Mayer, Ltd

[57] ABSTRACT

The invention relates to a device and method for removal of impurities from, and recirculation of, cleaning agent in a printing machine. Contaminated cleaning agent is purified by passing it through a series of sedimentation devices. In these sedimentation devices, gravity is used to separate the cleaning agent into its constituent parts. Once the impurities have been removed from the cleaning agent, the constituent parts that can be reused are recirculated to the washing devices of the printing machine while the impurities are disposed appropriately.

7 Claims, 3 Drawing Sheets

DEVICE AND METHOD FOR PURIFICATION AND RECIRCULATION OF CLEANING AGENT IN A PRINTING MACHINE

FIELD OF THE INVENTION

This invention relates to a device and a method for the removal of impurities from, and recirculation of, cleaning agent in a printing machine.

BACKGROUND OF THE INVENTION

Printing machines capable of removing impurities from, and recirculating, cleaning agent are known to the art. For example, U.S. Pat. No. 5,323,705 discloses a cleaning device that possesses, as a processing unit, a distillation appliance and a downstream gravity separator which separates the distillate into water and solvent. Water and solvent are then recirculated to the washing device individually and in succession.

U.S. Pat. No. 5,069,755 discloses a particulate removal and recirculation system which utilizes a centrifuge and a filter. According to the disclosure, coarse impurities (e.g., ink and/or solids) are separated from the washing agent by a centrifuge and finer impurities are separated from the washing agent by a filter. U.S. Pat. No. 4,317,720 also discloses a device for separating and recovering cleaning solvent, used for cleaning parts, from the water used to wash the cleaning solvent from the part.

These prior art devices and methods, however, are incapable of achieving a high degree of purification, especially in the case of vegetable based cleaning fluids.

SUMMARY OF THE INVENTION

The main object of the invention is to provide a device and a method for achieving a high degree of purification of the washing agent used in a printing press, especially washing agents which have vegetable based washing fluids as a constituent part, and to recirculate the purified constituent parts of the washing agent back to the printing press at a low cost.

In the following discussions and examples, a washing agent with three constituent parts—washing fluid, suspended solids, and water—will be discussed. It is understood, however, that the invention is adaptable to any washing agent consisting of at least two constituent parts.

The contaminated washing agent from all the washing devices in the printing machine is supplied to a first sedimentation device. In this first sedimentation device, the washing fluid, with a lighter specific gravity than the water, separates from and rests above the water. The suspended solids in the washing agent (e.g., ink particles, paper fluff, and/or powder), which have a specific gravity lighter than the water but heavier than the washing fluid, will rest in between the washing fluid and the water in the sedimentation device. Higher separation efficiency is achieved if the sedimentation device is designed with a relatively larger height and a relatively small width. Once the washing agent's constituent parts have separated into essentially distinct groups, the washing agent can be drained or sucked out of the sedimentation device into other sedimentation devices for further purification. Preferably, however, the washing agent is drained out of the bottom of the first sedimentation device.

As the washing agent is drained out of the first sedimentation device, sensors in the purification and recirculation device detect individual constituent parts and signal a controller to activate valves that separate the constituent parts of the washing agent for storage in individual receiving containers of subsequent sedimentation devices. It can be appreciated that any number of subsequent sedimentation devices can be placed downstream of the first sedimentation device. After the washing agent has been drained out of the last sedimentation device, the purified washing fluid and the purified water are separately returned to the washing devices of the printing machine. At this stage, the suspended solids are in the form of a concentrated emulsion and can be thickened with flocculent and/or supplied to a disposal container.

Depending on the degree of purification required, the washing fluid and water can be resupplied to the washing devices as early as after passing through two sedimentation devices or after passing through many more sedimentation devices. If necessary, fresh washing fluid and fresh water can be added to the washing agent as it is passing through the sedimentation devices.

These and other features and advantages of the invention will be more readily apparent upon reading the following description of the preferred embodiment of the invention and upon reference to the accompanying drawings wherein:

DETAILED DESCRIPTION OF THE ILLUSTRATED EMBODIMENT

While the invention will be described in connection with an illustrated embodiment, there is no intent to limit it to that embodiment. On the contrary, the intent is to cover all alternatives, modifications, and equivalents included within the spirit and scope of the invention as defined by the appended claims.

Figure 1:
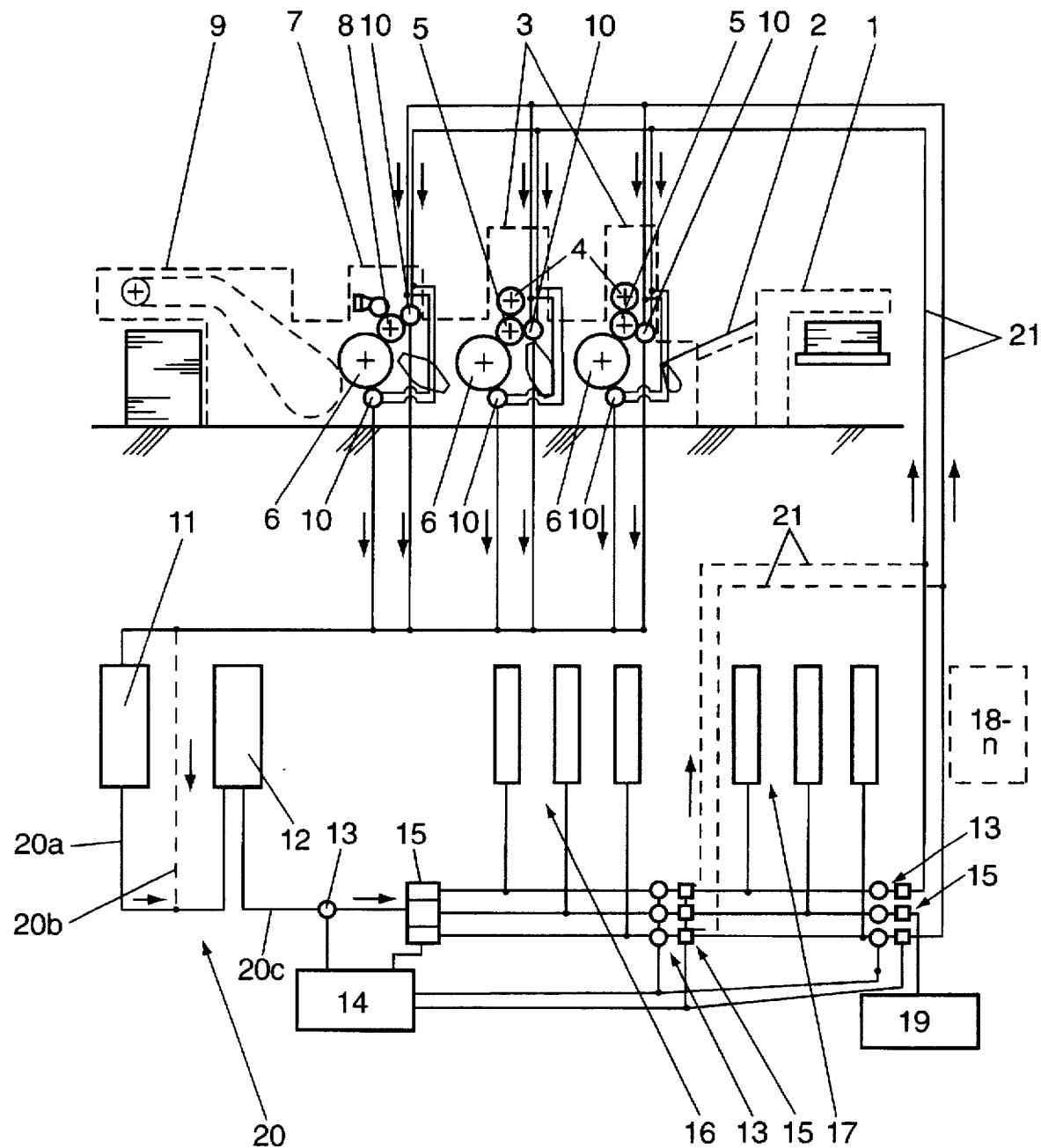
FIG. 1 depicts a printing machine with a purification and recirculation device according to the invention.

Turning first to FIG. 1, a sheet-fed rotary printing machine is illustrated with a feeder 1, a supply table 2, two printing units 3 arranged in series, a varnishing unit 7, and a delivery 9. Each printing unit 3 consists of a plate cylinder 4, a rubber-blanket cylinder 5, and an impression cylinder 6. The printing machine also includes transfer drums (not shown) for transferring sheets between the printing units 3. The varnishing unit 7 consists of a form cylinder 8 and an impression cylinder 6.

The design and operation of the inking and dampening unit in the printing units 3, and of the metering system in the varnishing unit 7, are well known to those with ordinary skill in the art and are mentioned here only to highlight that the inking and dampening units possess a cleaning-fluid supply device, arranged in the inking-roller train, and a discharge device for contaminated cleaning fluid. The cleaning-fluid supply device is preferably a spray nozzle and the discharge device is preferably a doctor blade capable of being actuated onto and off a roller. The cleaning-fluid supply device and the discharge device are incorporated into the purification and recirculation device through the conduits 20 and 21. For the sake of clarity, FIG. 1 does not show the incorporation of the rollers into the purification and recirculation device.

A washing device 10 is assigned to each rubber-blanket cylinder 5 and impression cylinder 6 of each printing unit 3 and to the impression cylinder 6 and form cylinder 8 of the varnishing unit 7. The washing devices 10 can be actuated to engage and clean the cylinders of the printing units 3 and varnishing unit 7, or to disengage from the cylinders. The washing devices 10 can be covered by rollers, cloth, or other material conducive to cleaning the cylinders. Further, the washing devices 10 can be designed as spray devices or as combined spray/suction devices. Each washing device 10 of each printing unit 3 and varnishing unit 7 has a separate supply of water and washing fluid, and a common conduit 20 for discharge of contaminated washing agent into the purification and recirculation device. A plurality of sedimentation devices 12 and 16 through N for treating the contaminated washing agent are arranged downstream of the washing devices 10 for separating the washing agent into its constituent parts and purifying the constituent parts.

The washing agent and its constituent parts are recirculated through the conduit 20, sedimentation devices 12 and 16 through N, and conduit 21 in a conventional manner using pumps to move the washing agent through the system. The use of these pumps is well known in the art as disclosed, for example, in U.S. Pat. No. 5,323,705, which is incorporated by reference in its entirety and which is assigned to the same assignee as that of the present invention.

The first sedimentation device 12 is designed as a receiving container for the washing agent. The second sedimentation device 16 and every other sedimentation device 17 through N is each preferably designed with as many receiving containers as there are constituent parts to the washing agent. It can be appreciated, however, that each one of the sedimentation devices 17 through N does not necessarily need to have as many receiving containers as there are constituent parts to the washing agent. In other words, after the second sedimentation device 16, each constituent part of the washing agent does not need to undergo the same number of purification steps. In the illustrated embodiment, for example, sedimentation device 16 and each subsequent sedimentation device 17 through N has three receiving containers—one for washing fluid, one for suspended solids, and one for water. The receiving containers of the sedimentation devices preferably are designed with a relatively large height and relatively small width and are connected to one another by the conduit system 20.

In the conduit system 20, each of the sedimentation devices 16 through N is preceded by actuatable valves 15 for directing the individual constituent parts of the washing agent into the appropriate receiving container for that constituent part. The valves 15 can be controlled manually, but preferably are controlled electronically by a controller 14. To control the valves, sensors 13 are placed on the conduit system between the first sedimentation device 12 and the second sedimentation device 16, and between every sedimentation device 16 through N thereafter. The sensors 13 sense the type and purity of the constituent parts flowing past the sensor and are coupled to a controller 14, which electronically controls the actuation of the valves 15. Between the sedimentation device 12 and the sedimentation device 16, the conduit system 20 branches, preferably at the valves 15, according to the number of constituent parts of the washing agent. For example, in the illustrated embodiment the washing agent has three constituent parts; therefore, the conduit system 20 branches into three separate routes.

In the preferred embodiment, the first sedimentation device 12 is preceded by a buffer storage 11. The buffer storage 11 receives the contaminated washing agent and intermediately stores it before periodically delivering a volume of the contaminated washing agent to the first sedimentation device 12 through the conduit 20a. If a buffer storage 11 is not utilized, then the contaminated washing agent is routed through conduit 20b directly to the first sedimentation device 12. The last one of the sedimentation devices 16 through N is followed in the conduit system by a disposal container 19 for disposing of the suspended solids and other impurities in the washing agent. In the disposal container 19, flocculants can be supplied to the suspended solids and/or the suspended solids can be disposed appropriately.

Depending on the properties of the constituent parts of the cleaning agent, the sedimentation devices 17 through N may have receiving containers for only some of the washing agent's constituent parts. In other words, not all constituent parts of the washing agent need to undergo the same number of purification steps before being recirculated to the washing devices 10 or being disposed appropriately. For example, the sedimentation devices 17 through N may consist of only receiving containers for washing fluid and water, and not for suspended solids.

As previously mentioned, the sensors 13 are capable of sensing the purity of the constituent part flowing past the sensor. As will be explained in detail herein, the invention is capable of routing some of a particular constituent part back to the washing devices 10 (through the conduit 21) while routing the remainder for further purification. For example, after passing through sedimentation device 16, some of the water may be pure enough for immediate recirculation to the washing devices 10 through the conduit 21, while the remaining water continues to the sedimentation device 17. For this purpose, conduit 21 has branches that are connected to the valves 15 between the sedimentation devices 16 and 17. It can be appreciated that such early recirculation routes can be placed between any two sedimentation devices.

The invention can be better understood by following the path of the washing agent as it is purified and recirculated to the washing devices 10. Contaminated washing agent is discharged from the washing devices 10 into the conduit system 20. If a buffer storage 11 is utilized, the contaminated cleaning fluid is intermediately stored in the buffer storage and periodically supplied to the first sedimentation device 12 through the conduit 20. Otherwise, a specific quantity of cleaning fluid is constantly supplied directly to the first sedimentation device 12 via the conduit 20b. The washing agent in the sedimentation device 12 is discharged before a new quantity of contaminated washing agent is supplied to avoid remixing the constituent parts of the washing agent that have already been separated.

After the washing agent enters the sedimentation device 12, it is left to rest until gravity separates the washing agent into its constituent parts (e.g., suspended solids, washing fluid and water). Once the washing agent has separated into its constituent parts, the sedimentation device 12 is emptied through the conduit 20c. The sensor 13 senses the type and purity of the constituent parts of the washing agent and provides this information to the controller 14. The controller 14 and sensors 13 are commercially available devices that are well known to those with ordinary skill in the art and are produced by manufacturers such as Siemens or Honeywell under various model numbers.

The controller 14 actuates the valves 15 such that the three constituent parts of the washing agent are stored in three separate receiving containers in the sedimentation device 16. The valves 15 are interconnected to one another (e.g., through a pipe) to allow the contents of a single receiving container in one sedimentation device to be routed to any combination of receiving containers in the next sedimentation device. In this manner, each individual constituent part in each individual receiving container can be further purified as it flows through successive sedimentation devices.

In the sedimentation device 16, the three constituent parts of the washing agent undergo further gravity separation to further purify the constituent parts of the washing agent. The sedimentation device 16 can be followed by as many other sedimentation devices 17 through N as needed, each preferably with three separate receiving containers, to completely purify the constituent parts of the washing agent. As mentioned previously, however, the subsequent sedimentation devices do not need to have the same number of receiving containers as constituent parts, and the constituent parts of the washing agent do not need to undergo the same number of purification steps.

Figure 2:
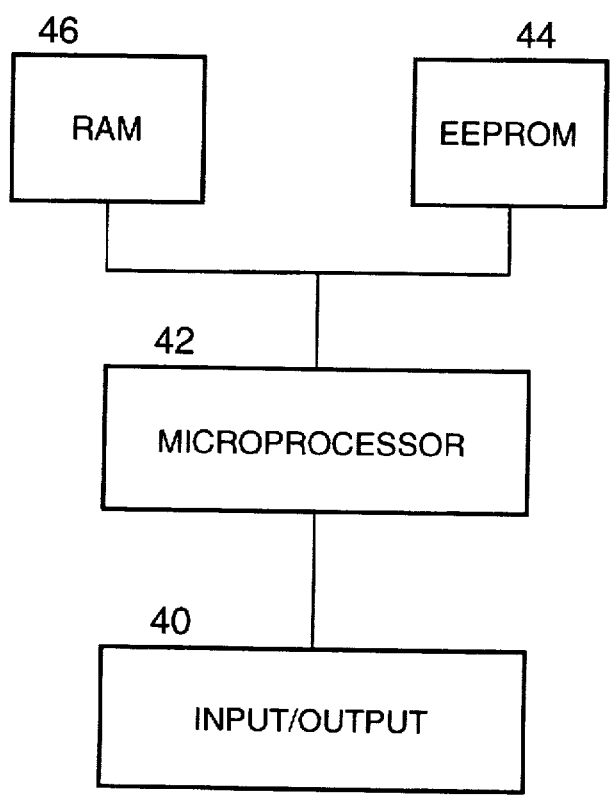
FIG. 2 is a block diagram of an exemplary controller for the purification and recirculation device of FIG. 1.

The sensors 13 and valves 15 are connected to, and controlled by, the electronic controller 14. The controller 14 is a programmable controller with a memory, and as mentioned above is commercially available and well known to those with ordinary skill in the art. As illustrated in FIG. 2, the controller 14 includes an input/output unit 40 for communicating with the sensors 13 and valves 15. A microprocessor 42 executes the control functions stored in the controller's electronically erasable programmable read only memory (EEPROM) 44. A read only memory (RAM) 46 stores information specific to the particular purification and recirculation device being controlled (e.g., purity values for constituent parts, locations and properties of valves, etc.)

It can be appreciated that the combination of the sensors 13, controller 14, and valves 15 may function to allow a portion of a constituent part to be recirculated while another portion continues to the next sedimentation device. For example, as the water is drained from the receiving container in the sedimentation device 16, the first and middle portion may be adequately purified while the last portion (which is closest to the suspended solids and washing fluid floating on top of the receiving container) may not be adequately purified. Thus, based on signals generated by the sensors 13, the controller 14 actuates the valves 15 such that the first and middle portion of the water are recirculated to the washing devices 10 through the conduit 21, while the last portion continues to the next sedimentation device 17.

In another example, after the washing agent has passed through the sedimentation device 16, the signals from the sensors 13 indicate to the controller 14 that the water and washing fluid are adequately purified for returning to the washing devices 10, while the suspended solids require further purification in the sedimentation device 17. Thus, the controller 14 will actuate the valves 15 such that the water and washing fluid are recirculated to the washing devices 10 through the conduit 21 while the suspended solids continue to sedimentation device 17 for further purification and extraction of water and washing fluid. After the suspended solids are further purified in the sedimentation device 17, the remaining water and washing fluid are returned to the washing devices 10 through the conduit 21 and the suspended solids, having been further purified and thickened, are routed to the disposal storage 19.

Figure 3:
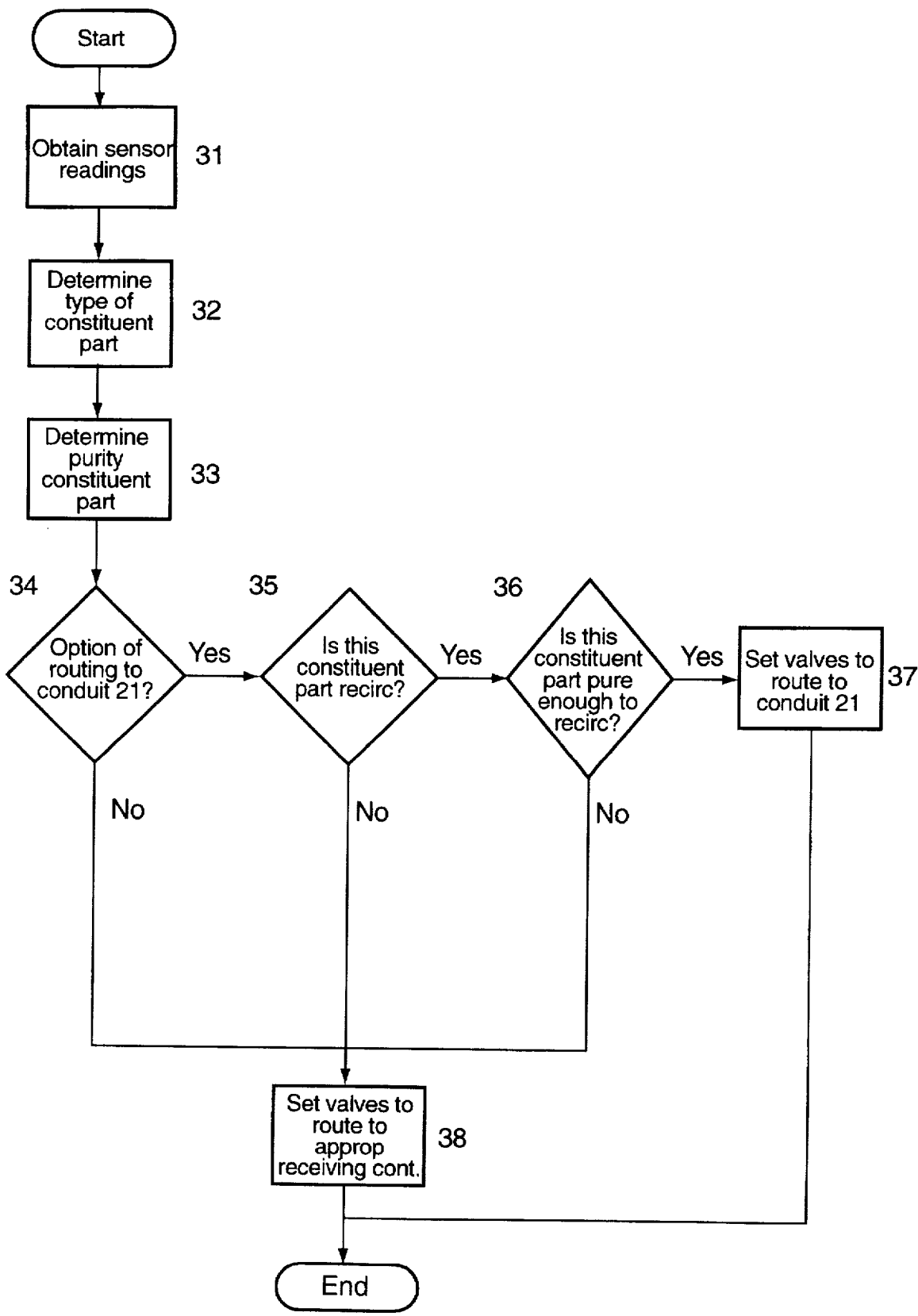
FIG. 3 is a flow diagram illustrating the steps executed by the controller of FIGS. 1 and 2.

In order for the controller 14 to respond to the sensors 13 and control the valves 15 as described above, it executes the steps of FIG. 3. At step 31, the processor inputs the readings obtained by the sensors 13. The processor 14 stores information in its RAM 44 regarding the types of constituent parts that comprise the washing agent and relevant purity values for those constituent parts. At steps 32 and 33 the processor 14 compares the values obtained by the sensors 13 to values stored in the controller's RAM 44 to determine the type of constituent part sensed by the sensor and the purity of that constituent part.

At step 34, the controller determines whether the valves 15 corresponding to the sensors 13 from which it is inputting information are directly connected to the conduit 21. If the valves 15 are directly connected to the conduit 21 (e.g., the valves between sedimentation device 16 and 17 in FIG. 1), then at step 35 the controller determines whether the constituent part flowing past the sensor is suitable for recirculation to the washing devices (e.g., washing fluid or water, but not suspended solids). If the constituent part is not suitable for recirculation, then at step 38 the controller will position the valves to route the constituent part to the appropriate receiving container in the next sedimentation device.

If at step 35 the constituent part is suitable for recirculation, the controller at step 36 will determine whether the constituent part is pure enough to be recirculated. If it is, at step 37 the controller positions the valves to route the constituent part to the conduit 21. If the constituent part is not pure enough, then at step 38 the controller will position the valves to route the constituent part to the appropriate receiving container in the next sedimentation device.

If at step 34 the controller determines that the valves 15 are not directly connected to the conduit 21 (e.g., the valves between the sedimentation devices 12 and 16), then the controller will position the valves to route the constituent part to the appropriate receiving container of the next sedimentation device.

From the description above it can be appreciated that an improved device and method for purifying and recirculating washing agent is disclosed. Further advantages and improvements are evident from the appended claims.

We claim:

1. A device for purifying and recirculating contaminated washing agent in a printing machine with a washing device comprising: a first and a second sedimentation device, wherein the first sedimentation device holds and separates into constituent parts a supply of contaminated washing agent and wherein the second sedimentation device is comprised of separate receiving containers for each constituent part of the supply of contaminated washing agent; an electronic controller preceding the second sedimentation device responsive to at least one sensor for controlling at least one valve, where the sensor senses the constituent parts of the contaminated washing agent as they exit the first sedimentation device and the controller actuates the valve to route the constituent parts of the contaminated washing agent either back to the washing device or to the separate receiving containers for each constituent part in the second sedimentation device; a disposal storage located downstream of the second sedimentation device for storing one or more of the separated constituent parts of the contaminated washing agent; a conduit for transporting the contaminated washing agent from the washing device to the first and second sedimentation devices and returning the purified reusable constituent parts of the contaminated washing agent to the washing device.

2. The device of claim 1, further comprising a buffer storage interposed between the washing device and the first sedimentation device, wherein the buffer storage temporarily holds the contaminated washing agent and periodically provides the first sedimentation device with contaminated washing agent.

3. The device of claim 1, wherein the first sedimentation device is a single storage tank.

4. The device of claim 3, wherein the storage tank is longer than it is wide.

5. The device of claim 1, wherein the second sedimentation device is comprised of three receiving containers, one for washing fluid, one for suspended solids, and one for water.

6. A method for purifying and recirculating contaminated washing agent in a printing machine with a washing device, comprising the steps of:

collecting the contaminated washing agent, which comprises two or more constituent parts, in a first sedimentation device;

holding the contaminated washing agent in the first sedimentation device until gravitational forces separated the agent into at least two of its constituent parts;

draining the contaminated washing agent into a second sedimentation device having a separate holding tank for each of the separate constituent parts from the first sedimentation device;

the method further comprising passing the contaminated washing agent through at least one sensor and at least one valve to route the separate constituent parts into separate holding tanks of the second sedimentation device;

storing one or more of the separated constituent parts of the contaminated washing agent in a disposal storage;

returning to the washing device the remaining separated constituent parts of the contaminated washing agent as purified washing agent.

7. The method of claim 6, wherein the separate holding tanks of the second sedimentation device hold their respective constituent part until gravitational forces further purify the constituent part.

* * * * *